United States Patent
Alurkar et al.

(10) Patent No.: US 12,476,886 B1
(45) Date of Patent: Nov. 18, 2025

(54) COMMUNICATION PLATFORM WITH INTEGRATED SERVICE INTERFACE

(71) Applicant: Zoom Video Communications, Inc, San Jose, CA (US)

(72) Inventors: Aakash Atul Alurkar, San Jose, CA (US); Adi David Regev, Fairlawn, NJ (US)

(73) Assignee: Zoom Communications, Inc., San Jose, CA (US)

( * ) Notice: Subject to any disclaimer, the term of this patent is extended or adjusted under 35 U.S.C. 154(b) by 85 days.

(21) Appl. No.: 18/591,727

(22) Filed: Feb. 29, 2024

(51) Int. Cl.
*G06F 9/54* (2006.01)
*H04L 9/40* (2022.01)
*H04L 41/5054* (2022.01)

(52) U.S. Cl.
CPC ...... *H04L 41/5054* (2013.01); *H04L 63/0815* (2013.01); *H04L 63/20* (2013.01)

(58) Field of Classification Search
None
See application file for complete search history.

(56) References Cited

U.S. PATENT DOCUMENTS

2022/0092713 A1 * 3/2022 Bracken ............... H04L 67/561

FOREIGN PATENT DOCUMENTS

| JP | 2017033339 A | * | 2/2017 | ......... H04N 1/00344 |
| WO | WO-2021244644 A1 | * | 12/2021 | ............... G06F 8/61 |

\* cited by examiner

*Primary Examiner* — Natisha D Cox
(74) *Attorney, Agent, or Firm* — Kilpatrick Townsend & Stockton, LLP

(57) ABSTRACT

Example methods and systems provide a communication platform client application that includes tightly and seamlessly integrated management of a curated, external service or suite of services. An application programming interface (API) is used to access and manage the external service, and an application marketplace or app store can make it possible for a user of the client application to choose from among multiple vendors of external services. The system can transmit, in response to a selection input, communication platform account information to the external service and update a license database using credentials for the service account. The external service can then be connected to the client application using the information in the license database.

20 Claims, 9 Drawing Sheets

COMMUNICATION PLATFORM WITH INTEGRATED SERVICE INTERFACE

FIELD

The present application generally relates to a communication platform such as for videoconferencing, where the communication platform includes software components that provide a tightly and seamlessly integrated external service interface that can access a curated, external suite of services, for example compliance and information protection services. More particularly the application relates to automatically provisioning a user account with an external service provider and providing authentication services in order to seamlessly integrate the external service into the client application for the communication platform.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
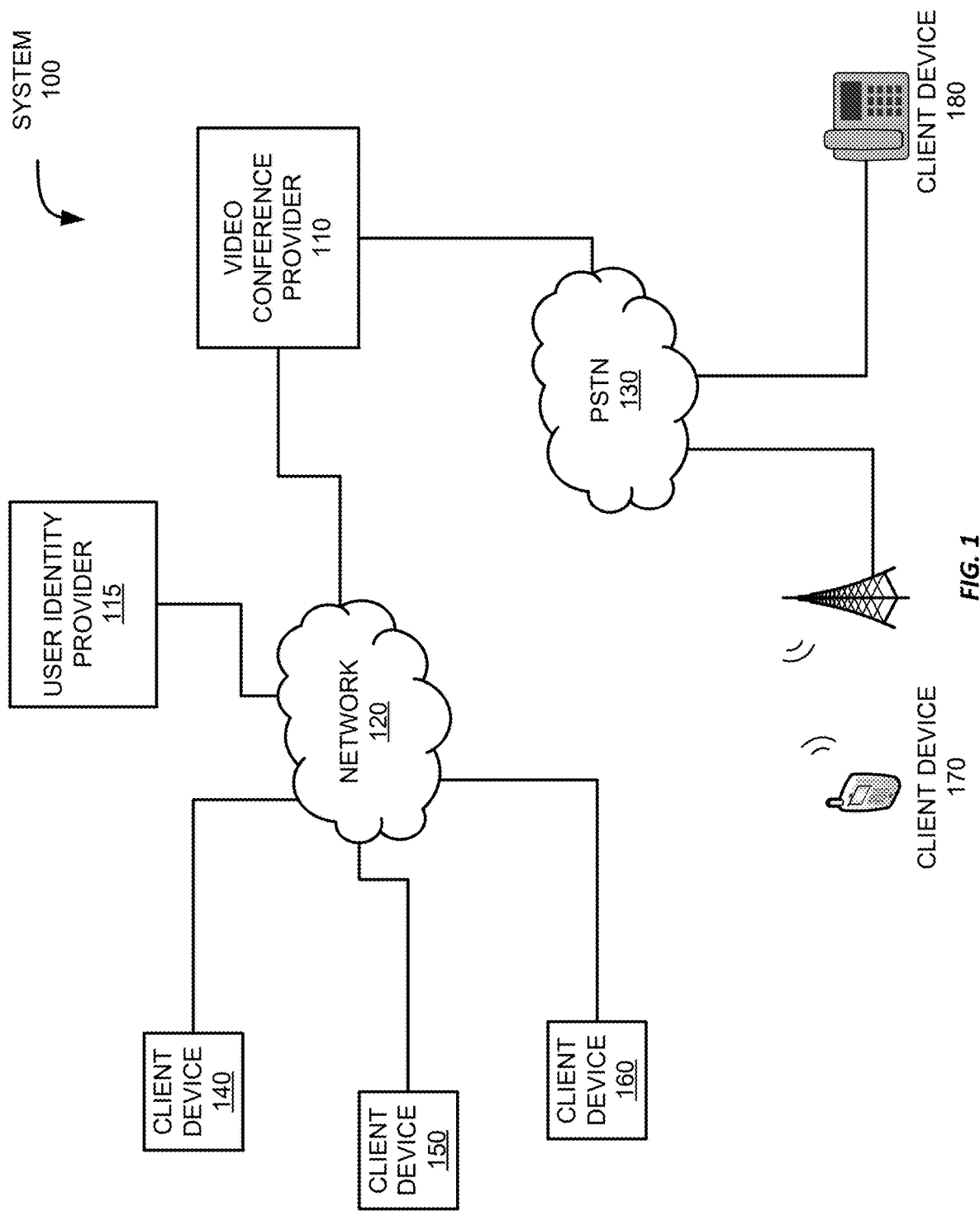
FIGS. 1 through 3 illustrate example systems to enable a communication platform with an integrated service interface.

Examples are described herein in the context of systems and methods for providing a communication platform with an integrated service interface. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Digital telephone systems as well as videoconferencing systems enable their users to engage in teleconferencing by creating and attending conferences (or "meetings") via various types of client devices. After joining a meeting, the participants receive audio and/or video streams or feeds (or "multimedia" streams or feeds) from the other participants and, in the case of a videoconference, are presented with views of the video feeds from one or more of the other participants and audio from the audio feeds. Using these different modalities, the participants can see and/or hear each other, engage more deeply, and generally have a richer experience despite not being physically in the same space.

In the case of videoconferencing systems, to create a meeting, a person (referred to as the "host" or "meeting host") accesses the videoconferencing system, schedules a new meeting, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information. The initial, or main host can, in some systems, make another participant a co-host. For purposes of the discussion herein, the term "host" encompasses hosts and co-hosts. Hosts can manage and control the videoconferencing session.

A team chat application can be used to streamline communication and promote collaboration and transparency between users. A team chat application provides instant text messaging between users who have the application installed on a client device or via a web-based application. Some team chat applications are integrated with a videoconferencing application or a project management application. A team chat application can provide users in an enterprise with a readily available and comfortable way to reach out to one another, make connections, and increase communication efficiency. Team chat systems typically include a server application or component along with client applications for different types of user devices. Chat content is persistently stored in the server application or component so that the chat history is available to participants in the future even after all participants have disconnected or shut down their client applications for a time. Team chat applications can include functions for creating chat groups. These functions may include various security mechanisms for limiting access to groups based on divisions within the enterprise, credentials established for a group, etc.

Compliance and information protection encompasses processes, data structures, and interfaces intended for recording, archiving, and monitoring communication, documentation, and collaboration, within an enterprise and between an enterprise and external entities with goals aimed at maintaining data integrity and minimizing information exfiltration. Examples include data archiving and retention, legal hold management, and eDiscovery management. Another example is compliance management, where records are maintained in such a manner as to demonstrate to regulators that archiving and monitoring obligations are met. A further example is data loss prevention, which involves preventing or mitigating accidental or intentional leaks of confidential information, trade secrets, personnel information, and the like. Compliance and information protection, including, but not limited to, all the activities described above, may be referred to herein as "compliance services."

Numerous vendors provide compliance services for enterprises of various sizes. Other kinds of information technology intensive services are also often provided to enterprises by external vendors. Other examples include recruiting and job placement services, travel management services, and automobile fleet management services. A further example is that of communication services. For example, a communication platform may include various services provided by physical or virtual servers for collaboration and communication, such as those for email, chat, and teleconferencing. Teleconferencing can be based on communication using digital telephony, videoconferencing or audioconferencing meetings, chat, messaging, and the like. These services may be accessed through communication platform client application that may be installed on a user device. These services may also be accessed via the Web.

Since collaborative communication is important in the enterprise context, the communication that takes place using a communication platform such as that described above may touch on many other services that are provided to the enterprise, including any of the services mentioned above. However, such services are not always integrated with the communication platform used by the enterprise. Setting up software connectors between the services is often complex and difficult, resulting in the software connectors being unstable, or being insufficient to enable all of the desired features. Users are often faced with using services in independent applications, if not completely, at least with respect to some functions. Mismatches between services can make it difficult or impossible to provide directory synchronization, diagnostics, and monitoring. These issues can be especially problematic with an external service that is important to enable the enterprise to meet legal and regulatory compliance requirements, such as a compliance and information protection service. Ideally, integration of such a service needs compliance policy synchronization, compliance profile synchronization, licensing and entitlement management, service level agreement coordination, and unified diagnostics and monitoring.

To provide more versatility and convenience for users of modern digital communication platforms and applications, a communication platform client application according to this disclosure includes interface and software components that provide tightly and seamlessly integrated management of a curated, external service or suite of services. The service can be acquired and accessed on the communication platform client, quickly and efficiently. An account with the external vendor can be managed fully automatically. Since an application programming interface (API) within an integrated application is used to access and manage the external service, the use of an app marketplace or app store can make it possible for a user of the communication platform client to choose from among multiple vendors of external services, right in the communication platform client. By an "external service" what is meant is that the service is provided by hardware and software outside of the ownership or control of the enterprise using the communication platform, for example, by an external vendor of the relevant service.

In some examples, the integrated service interface as described herein is used to provide compliance services. Such an integrated service interface can access one or more of an archiving application, a compliance management application, an eDiscovery application, a legal hold application or a data loss prevention application, as examples. The use of app marketplace or app store can make it possible for a user of the communication platform client to choose from among multiple vendors of external compliance services. A selection input for such external services can result in installation of a version of the compliance services application in which the built-in API and any network address information within the compliance services application is tailored to the particular compliance services vendor.

A system according to some examples can receives a selection input directed to connecting the communication platform client application with an external service portal. The external service portal corresponds to a specified external service provider, possibly from among multiple available external service providers. The system can transmit, in response to the selection input, communication platform account information to the external service and update a license database using credentials for a service account corresponding to the external service. The credentials can be received in response to the transmission of the communication platform account information. The system then automatically installs a service application configured to access the external service portal from within the communication platform client application and coordinates the communication platform account information with the credentials for the service account. This coordination uses the license database and an API within the service application.

In some examples, the communication platform can access the license database and the service application is activated to verify the credentials for the external service account, for example, credentials for an external compliance and information protection service. The service application, once installed, appears embedded within the communication platform client application. The external service can then be connected to the embedded and integrated service application and an authentication process can prompt the user for credentials, which may be single sign-on (SSO) credentials for the communication platform.

The techniques disclosed herein, when used for compliance and information protection services, can enable an application for accessing external compliance services to be seamlessly integrated into a communication platform client application. This integration allows all content passing through the communication platform to be treated equally as far as risk evaluation since the integrated compliance services application can access video and audio meetings, chat, messaging, and digital phone calls.

This illustrative example is given to introduce the reader to the general subject matter discussed herein and the disclosure is not limited to this example. The following sections describe various additional non-limiting examples and examples of systems and methods for providing communication platform with an integrated service interface.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
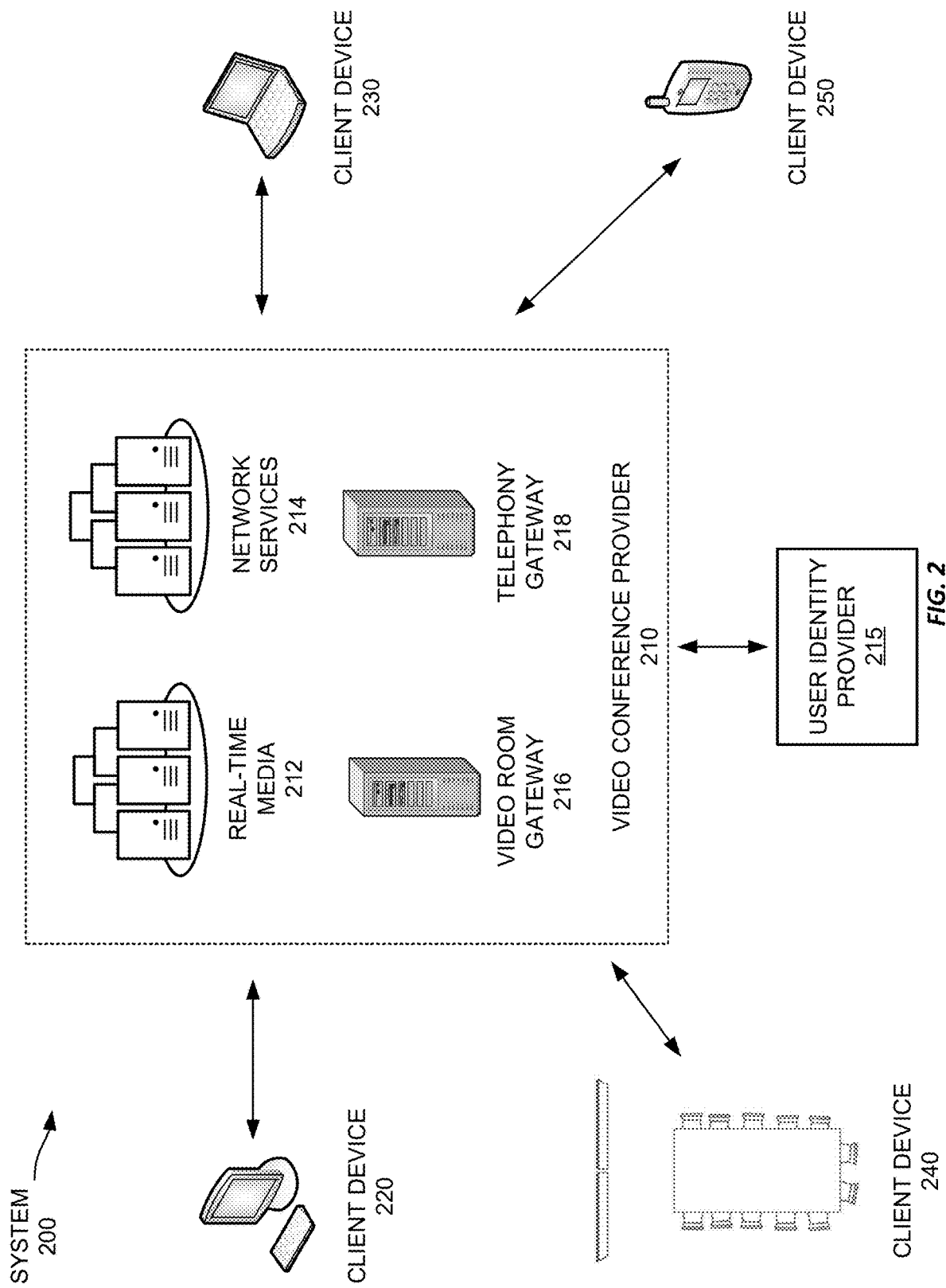

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the system of video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
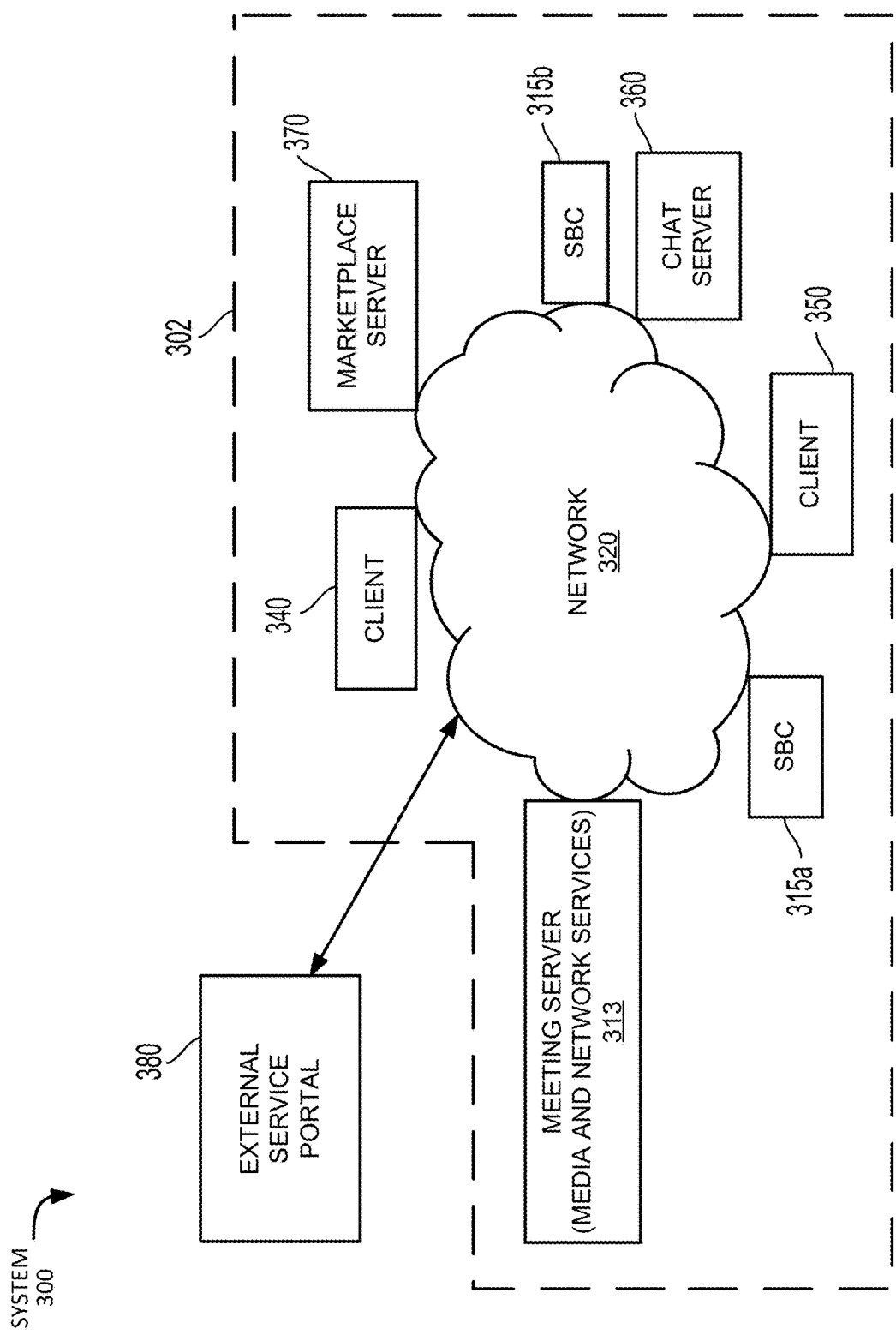

Referring now to FIG. 3, FIG. 3 shows an example integrated communication system 300 in which at least videoconferencing functionality, digital phone functionality and chat functionality is provided to various client devices, such as client device 340 and client device 350, each communicatively coupled to network 320. System 300 includes the integrated service capabilities as described herein. System 300 includes meeting server 313. Meeting server 313 may also be referred to as a multimedia router and can be implemented by the real-time media servers 212 working with the network services servers 214. The meeting server maintains stored representations of virtual meetings taking place in the system so that the meeting server can keep track of the status of meetings without constantly exchanging this information with client devices such as client device 340 and client device 350. System 300 includes chat server 360 that provides team chat services. Server 360 stores group definitions, which define chat groups, each with multiple users. The chat dialogs and identities of users participating in the chat groups can be presented to users through graphical interfaces of client applications running on client devices 340 and 350, either through a chat client application or through a communication platform client application that serves as a client application for multiple functions. Chat groups can also be provided in a Web browser along with other visual interface features to enable users of computing devices without a client application installed to make use of team chat services.

Example system 300 includes session border controllers (SBCs) 315*a-b* for providing digital telephony services. System 300 includes two SBCs as an example. Any number of SBCs can be used; multiple SBCs provide redundancy. The SBCs provide call CODECs, audio processing, error correction, links to telephone carriers, and encryption for digital telephone calls between client applications to provide digital phone services. The SBCs secure client and carrier communications passing through a data center. The SBCs include load balancers and call switches. As an example, signaling for call setup, management, and teardown in system 300 can be accomplished using session initiation protocol (SIP). SIP communication through the call switches is evenly distributed by the load balancers based on call volume. The call switches provide call control for digital telephone communications and can provide PBX functionality. The call switches also provide integrated functions to enable calls to be transitioned to videoconferences using meeting server 313 and/or vice versa.

In this example, client device 340 and client device 350 each include an instance of a communication platform client application, which can act as a unified interface for audio and/or video (A/V) conferencing, digital phone and chat capabilities, as well as others. The client application can be provided by a dedicated software client or by a web browser.

An A/V conferencing user interface can be coupled to meeting server 313 to provide videoconferencing meetings or to the SBCs to provide audioconferencing using digital telephony. External service portal 380 can be connected to network 320 and accessed by an external service application that provides the integrated service interface within the communication platform client applications of client device 340 and client device 350. In some examples, the external service application is embedded within the communication platform client application as if the functions provided by the external service application are being provided by the communication platform client application. The external service portal 380 can provide access to one or more compliance service applications provided by a compliance services vendor, which can be accessed through the integrated service interface. As examples, these services can include one or more of an archiving application, a compliance management application, an eDiscovery application, a legal hold application or a data loss prevention application. These services can be provided through their own, individual embedded applications and integrated interfaces, or multiple services can be provided in one embedded application and integrated interface with various menus and icons to access the various services.

Any or all of the compliance services applications in the integrated interface can access information communicated through the various communication platform channels, for example team chat, digital telephony channels, and meetings. Some communication platforms have additional services that may be included. Examples include electronic whiteboards, digital spaces or rooms, instant messaging, and email. These channels can be communicatively coupled to the communication platform client application on the client device, and to any integrated service application and integrated services interface.

Continuing with FIG. 3, system 300 includes marketplace server 370, which allows users of client devices such as client device 340 and client device 350 to obtain to access and install applications from an "app store" or "app marketplace." Such applications can include those that can be used with the communication platform client application to provide additional functionality. The integrated service application described herein can be obtained from the app store or app marketplace and installed on a client device, and such installation may be triggered automatically based on account credentials and a selection input by a user at a client device to connect the communication platform client to an external service. An integrated service application as described herein can appear within the user interface of the communication platform client and provide seamless access to the external services, such as external compliance services provided by a vendor through external service portal 380.

Figure 4:
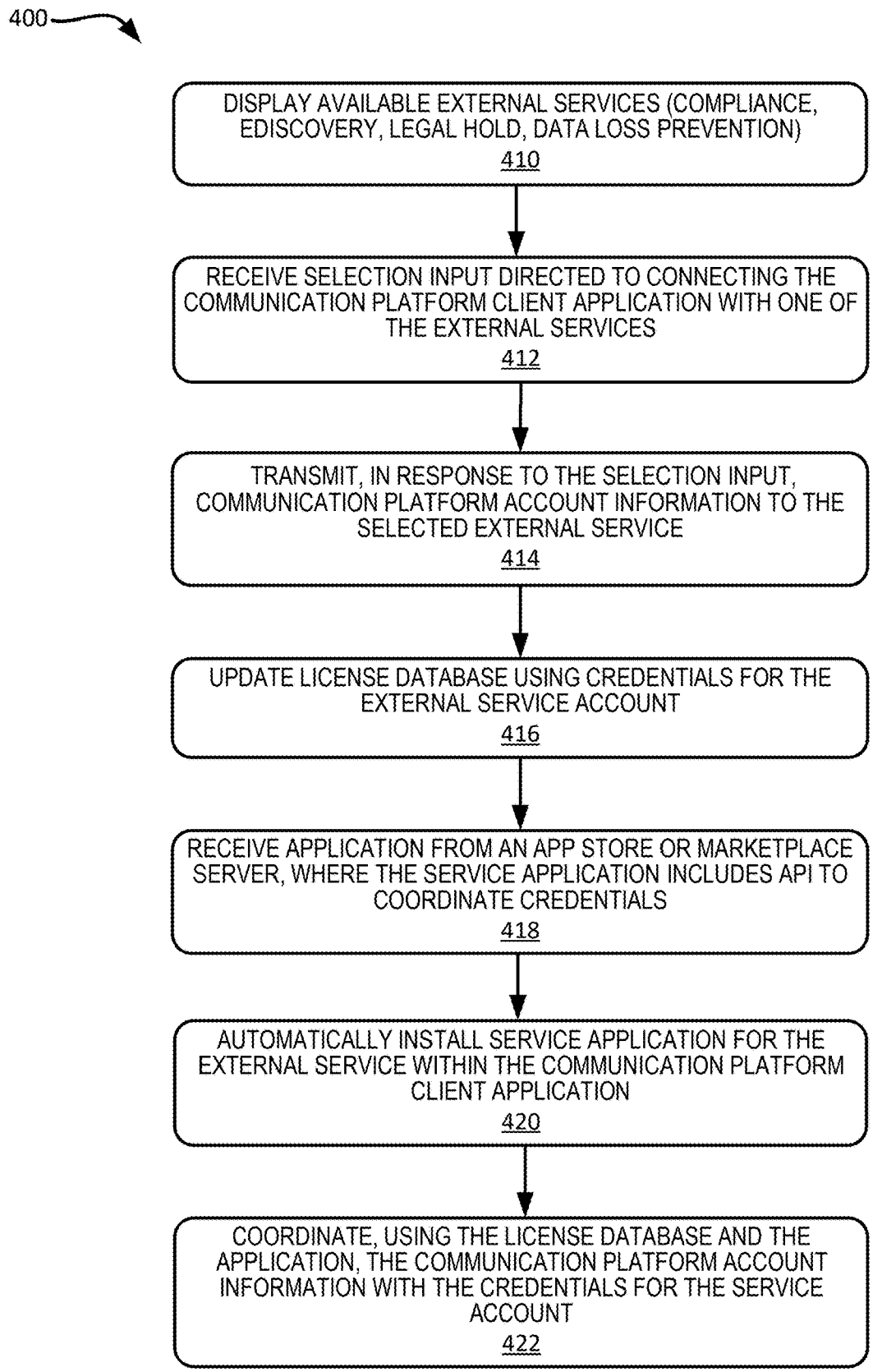
FIG. 4 illustrates an example method for providing a communication platform with an integrated service interface.

Referring now to the method 400 illustrated in FIG. 4, FIG. 4 shows an example method 400 for providing a communication platform with an integrated service interface. The description of the method 400 in FIG. 4 will be made with reference to the system of FIG. 3. However, any suitable system according to this disclosure may be used, such as the example systems 100 and 200 shown in FIGS. 1 and 2.

At block 410, a processor or processors, for example, a processor such as processor 910 (discussed below with respect to FIG. 9) running in the servers and/or in the client devices, displays available external services, for example on display 940 of client device 340 or client device 350. These external services may, as an example, be external compliance services such as for compliance management, eDiscovery, legal hold, or data loss prevention. At block 412, the processor receives a selection input directed to connecting the communication platform client application with one or more of the external services. At block 414, the processor transmits, in response to the selection input, communication platform account information to the selected external service. This information may be transmitted through the external service portal 380.

Continuing with method 400, at block 416, the processor updates the license database using credentials for the external service account. The license database will be further discussed below with respect to FIG. 5 and FIG. 7. The license database can be updated automatically. In some examples, the license database may already include entries indicating a that certain number of licenses for specific services are available for the enterprise, and the license database may be updated to indicate that the specific instance of the client application is making use of one of the available licenses. At block 418, the processor in the client device receives an external service application from an app store or marketplace server, for example, marketplace server 370 in FIG. 3. The service application includes an API to coordinate user credentials of the external service provider with those of the communication platform. The specified external service provider may be one selected from among multiple available external service providers. The service application's API and other programmatic features are configured to access the external service portal from within the communication platform client application.

At block 420 of method 400, the processor automatically installs the service application for the external service within the communication platform client application. The automatic installation may be triggered by the external service provider's systems through external service portal 380. At block 422, the service application is executed by the processor to coordinate the communication platform account information with the credentials for the service account using the license database.

Figure 5:
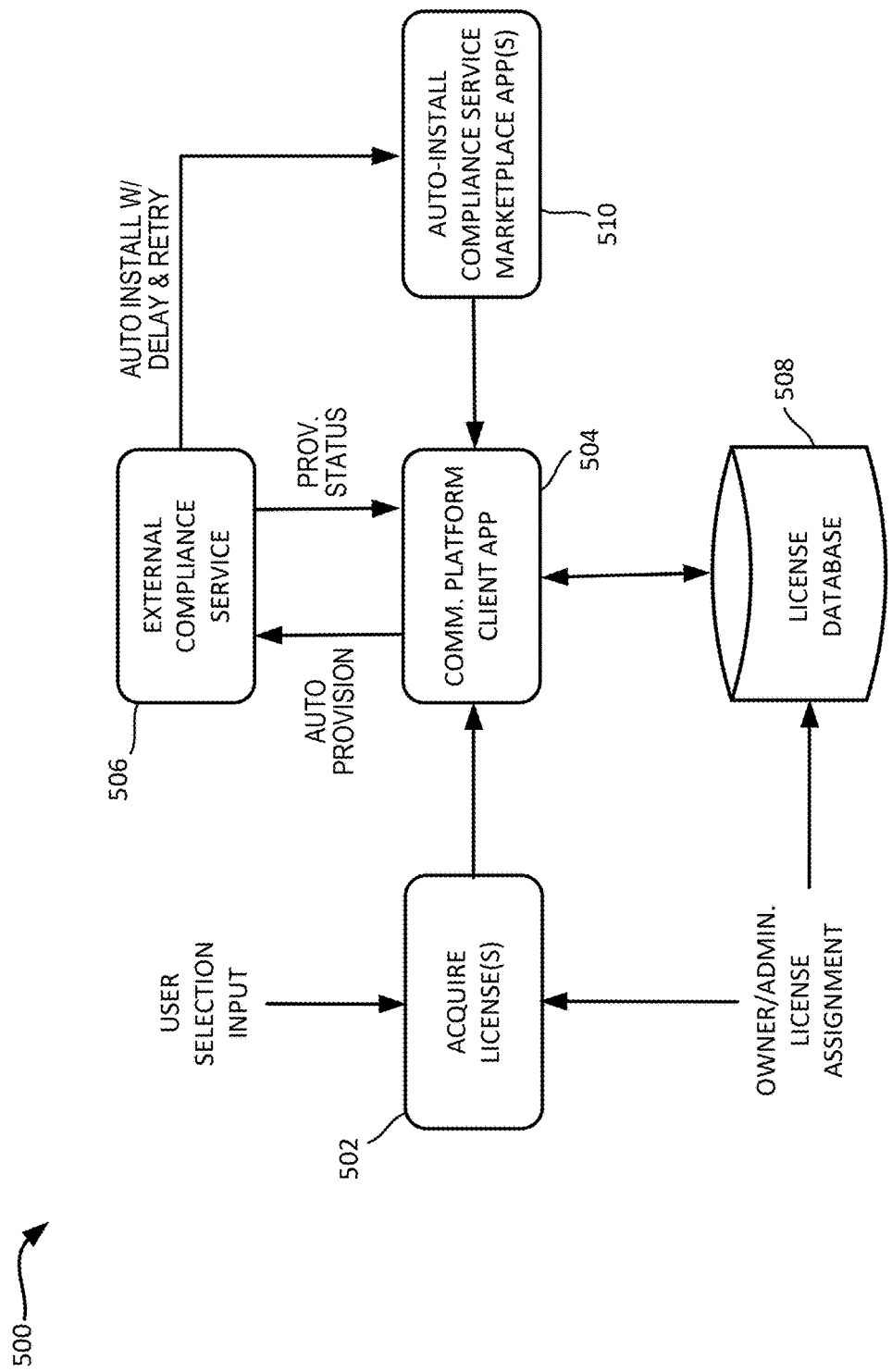
FIG. 5 illustrates an example process flow for providing a communication platform with an integrated service interface.

Referring now to the process flow 500 illustrated in FIG. 5, FIG. 5 shows an example process flow involving various software entities that together provide an external compliance and information protection service interface integrated with a communication platform. An input is received by a license acquisition software module 502 within the communication platform. The selection input can be from a user input received through user input device 950 shown in FIG. 9. Such an input indicates that the communication platform client is to be connected to the external compliance and information protection service and that one or more applications connected with this external service are to be installed so as to be embedded and/or integrated within the communication platform client application. Alternatively, input can be from a sales console of an external compliance vendor, or from a system owner or administrator for the communication platform and/or the external compliance and information protection service. In the latter case, a number of licenses of a specific product may be specified and this action may acquire licenses for multiple client devices and/or users.

Still referring to FIG. 5, the communication platform client application 504 sends an automatic provisioning message to the external compliance service 506, identifying account information for the communication platform, including credentials for using the communication platform. This provisioning message may be sent through the external service portal 380 for the external compliance and information protection service. The resources of the external service are directed by the automatic provisioning message to create a corresponding account with the external compliance service, which will send provisioning status messages back to the communication platform client application 504. Once the account with the external service is created, the next provisioning status message will notify the communication platform client application 504 and the client application will update license database 508 with the account information. Provisioning status messages may also indicate issues that need to be resolved and a notice can be displayed by the communication platform client application 504 so that the user or an administrator can take action. It should be noted that in the case of an administrator initiating the process, the license database 508 may be pre-populated with some of the information, which can be in turn verified by the communication platform client application 504.

API calls between the various entities shown in FIG. 5 can update license plans as necessary to make various external compliance services available for use. Specific permissions can be pre-provisioned to allow a compliance vendor to ingest credentials for the communication platform and to allow the communication platform to ingest credentials for the external service so that the application or applications that provide external compliance and information protection services can be seamlessly integrated with the communication platform client application. In order to provide this capability, the external service is provided with the ability to invoke an auto installation module 510 to install the marketplace (or app store) application that works with the specific external compliance and information protection service. The automatic installation process includes delay and retry processes to increase the chances that the applications will be installed without error. Eventually, an error message can be displayed by communication platform client application 504 if too many failures occur.

The automatic installation of the applications needed for the desired external compliance services enables the automatic provision of a gateway for the communication platform and the external service portal to communicate and exchange the data needed for any specific user of the two platforms. Each application includes an API and appropriate stored addresses and other variable values to connect the services. By including external service application(s) for multiple external service vendors' portals in the marketplace or app store, a specific user or enterprise can provide a selection input to choose from a menu of multiple external service provider selections and the appropriate applications will be seamlessly integrated with the communication platform client application. The user does not need to manually configure a generic interface within the communication platform client for a specific service provider. The communication platform client application can include a section, menu, or table for external service management, and selecting the service will enable an interface panel with appropriate indicator and controls. An example of such an integrated service interface will be discussed below with respect to FIG. 8.

Figure 6:
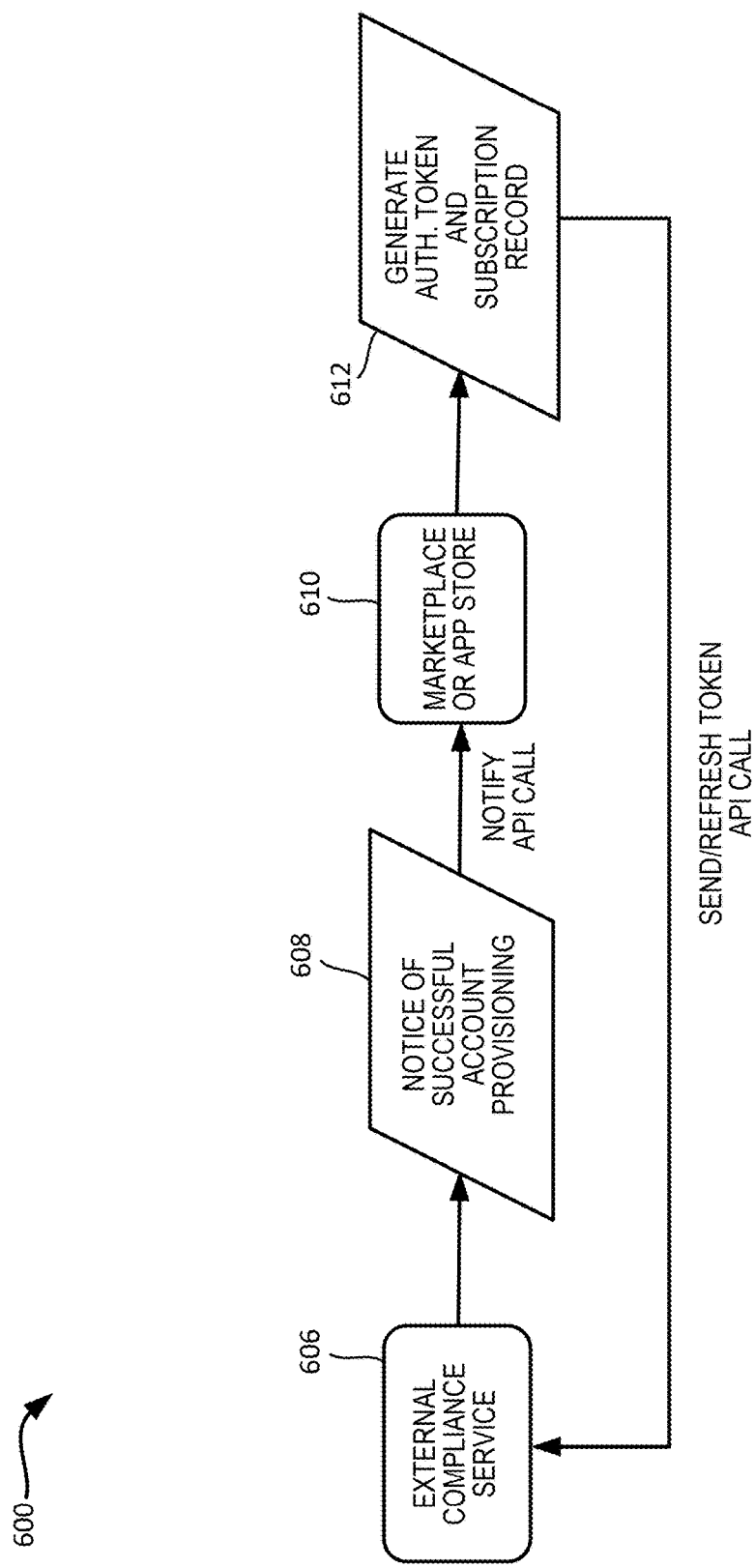
FIG. 6 illustrates another example process flow for providing a communication platform with an integrated service interface.

FIG. 6 illustrates another example process flow for providing a communication platform with an integrated service interface. Process flow 600 illustrates how authorization is maintained for use of an external compliance and information protection service. In this example, external compliance service 606 sends a message 608 to marketplace or app store 610 notifying the marketplace or app store of successful provisioning. The message is sent in the form of an API call to the marketplace server. The marketplace server then generates an authorization token and subscription record 612 by making an API call to the external compliance service, for example, through external service portal 380. In some examples, applications from a marketplace or app store are authorized for use until a specific date. An authorization token is an encrypted identifier of the application. The token can include this authorization information. In some embodiments, the communication platform includes a coded maximum authorization time. In such a case, the marketplace or app store server is programmatically set to send a refresh token at regular intervals for external services that have been authorized using the license database as described, to avoid an abrupt termination of access to the external service.

Figure 7:
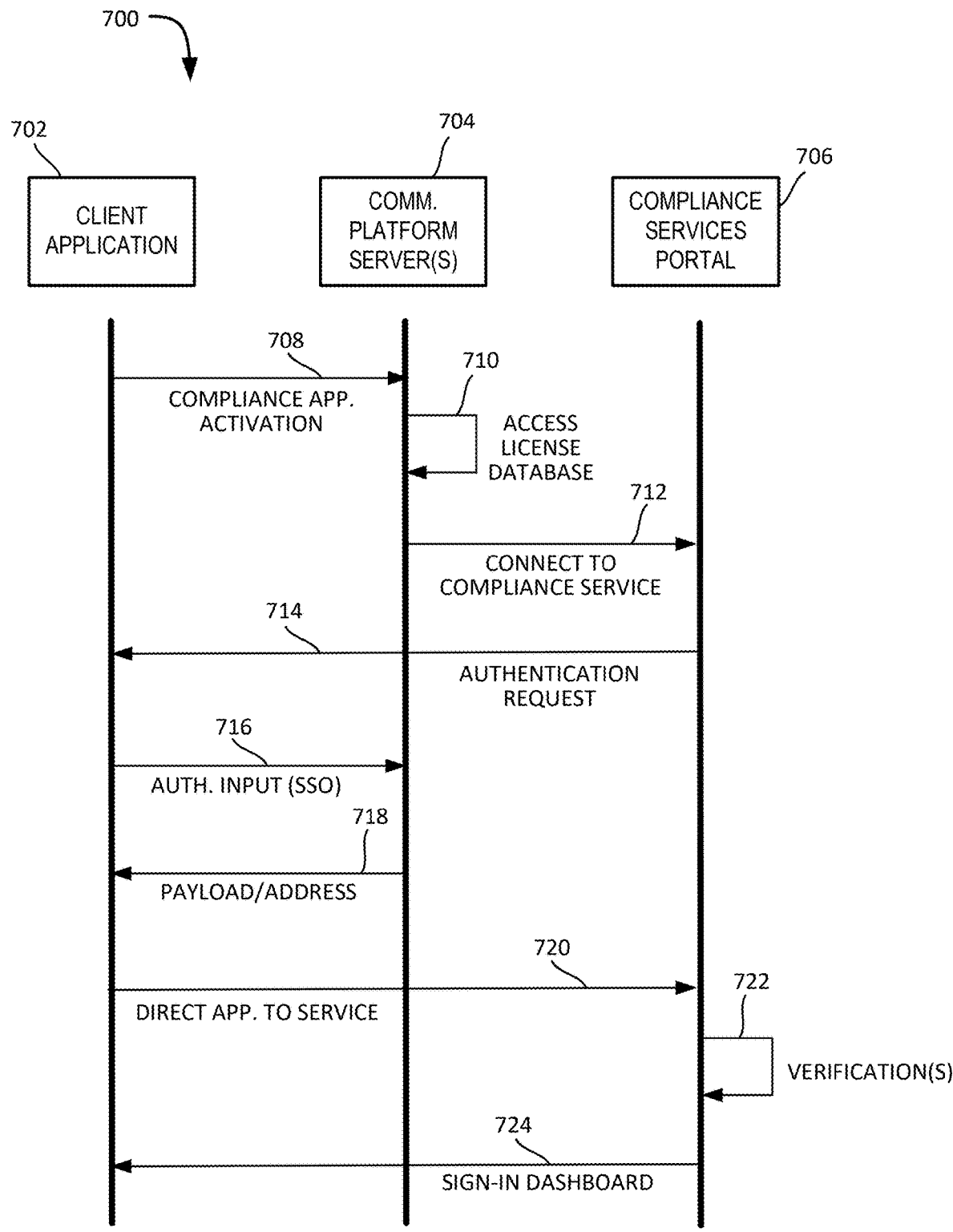
FIG. 7 illustrates an example message flow for providing a communication platform with an integrated service interface.

Referring now to the message flow 700, FIG. 7 illustrates an example message flow for providing a communication platform with an integrated service interface. Entities involved in the example messaging of FIG. 7 are the communication platform client application 702, the communication platform server or servers 704, and a compliance services portal 706. In response to an input received at the client application 702, an activation message 708 is transmitted to the communication platform server or servers 704. License database access 710 takes place within the communication platform server(s) in response to the activation of the compliance services application to verify credentials for the compliance and information protection service account. Connection message 712 is transmitted to the compliance services portal and an authentication request message 714 is transmitted back to the client application 702.

Continuing with FIG. 7, authentication input is received at client application 702 and an authentication input message 716 is transmitted to the communication platform server or servers 704. In some examples, the authentication is via SSO credentials, which are input to an input device such as user input device 950 discussed below with respect to FIG. 9. A payload message 718 including the appropriate network address is returned to the client application. In some examples, authentication request message 714 is a security assertion markup language (SAML) authentication request and payload message 718 including an SAML payload. SAML is a set of protocol messages based on extensible markup language (XML), bindings for the messages, and profiles including the set and the bindings. SAML can be used, as one example, to manage SSO authentication through a browser-based client. The SAML payload in this example can also include information on a user's roles, which in turn can inform which compliance and information protection services the user has the right to access under the license that is documented in the license database. In this way, changes that may have taken place can be accounted for with each connection. The appropriate client app or apps can be directed to the appropriate compliance service by message 720 and verifications 722 take place within the compliance services vendor. The appropriate dashboard screens are then populated using message 724.

Figure 8:
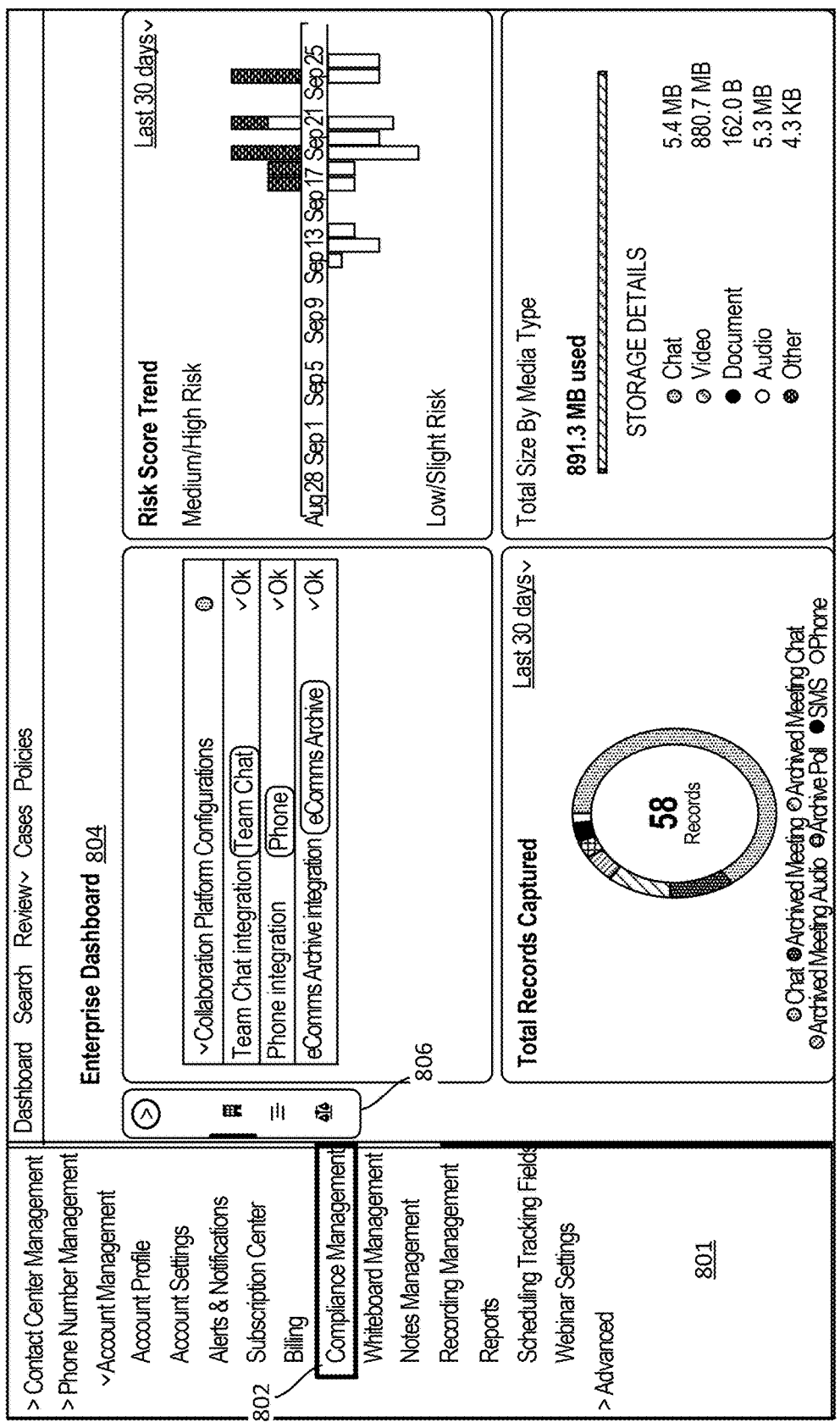
FIG. 8 illustrates an example screen shot generated by a communication platform with an integrated service interface.

Referring now to FIG. 8, FIG. 8 illustrates an example screenshot 800 generated by a communication platform with an integrated compliance services interface. Screenshot 800, for example, can be generated by communication platform client application 504. Menu 801 on the left side of screenshot 800 includes multiple interface screens that can be selected and displayed to access various functions and features of the communication platform through the communication platform client application. When item 802 is selected in the menu on the left of screenshot 800, a compliance services dashboard 804 is displayed. This dashboard is actually generated by an external compliance services vendor, but appears integrated with the communication platform client application in the same manner as other interfaces that can be displayed when selected in the menu on the left, any or all of which can be accessed within the communication platform client application. Screenshot 800 illustrates an enterprise compliance services dashboard 804 with multiple views or pages, which can be selected using panel 806.

Figure 9:
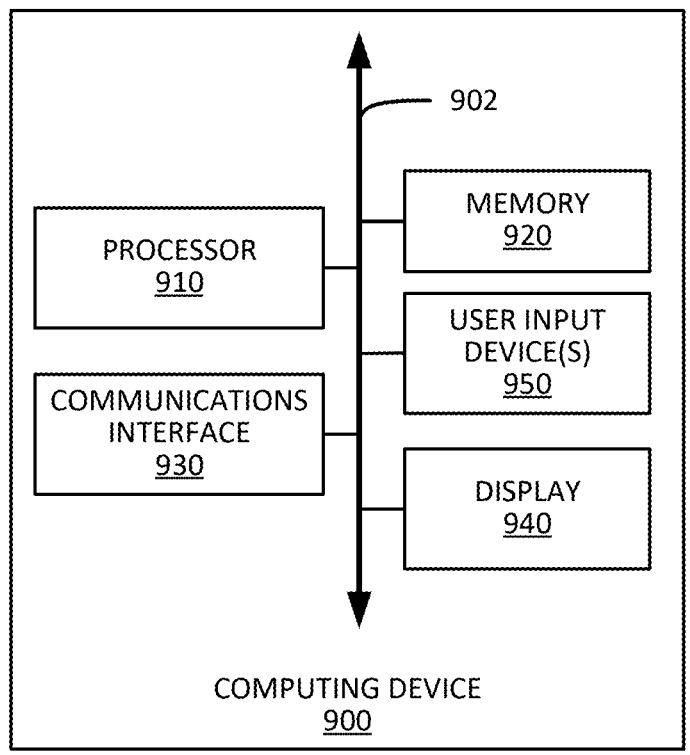
FIG. 9 shows an example computing device suitable for use with any disclosed systems, user interfaces, or methods according to this disclosure.

Referring now to FIG. 9, FIG. 9 shows an example computing device 900 suitable for use in example systems or methods for providing communication platforms with integrated service interfaces. The example computing device 900 includes a processor 910 which is in communication with the memory 920 and other components of the computing device 900 using one or more communications buses 902. The processor 910 is configured to execute processor-executable instructions stored in the memory 920 to perform one or more methods for providing an integrated service interface, for example, a compliance services interface as discussed above. The computing device, in this example, also includes one or more user input devices 950, such as a keyboard, mouse, touchscreen, video input device (e.g., one or more cameras), microphone, etc., to accept user input, for example user input directed to obtaining and using external services in an integrated fashion. The computing device 900 also includes a display 940 to provide visual output to a user, as examples, the screenshot of FIG. 8.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, memory device, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving a selection input directed to connecting a communication platform client application with an external service portal corresponding to a specified external service provider from among a plurality of available external service providers;
transmitting, in response to the selection input, communication platform account information to the external service portal;
updating a license database using credentials for a service account corresponding to the specified external service provider, the credentials received in response to the transmitting of the communication platform account information;
automatically installing at least one service application configured to access the external service portal from within the communication platform client application; and
coordinating, using the license database and the at least one service application, the communication platform account information with the credentials for the service account.

2. The method of claim 1, further comprising:
accessing the license database in response to activating the at least one service application to verify the credentials for the service account;
connecting the at least one service application to the external service portal in response to verifying the credentials;
displaying an authentication request from the specified external service provider in at least one of the communication platform client application or the at least one service application; and
directing the at least one service application to the external service portal in response to authentication input corresponding to the authentication request.

3. The method of claim 2, wherein the authentication input comprises single sign-on credentials.

4. The method of claim 1, further comprising displaying, in the communication platform client application, selections for the plurality of available external service providers, wherein the selection input is directed to selecting the specified external service provider from among the plurality of available external service providers.

5. The method of claim 4, wherein each of the plurality of available external service providers is a compliance and information protection service, and the at least one service application comprises at least one of an archiving application, a compliance management application, an eDiscovery application, a legal hold application or a data loss prevention application.

6. The method of claim 1, wherein the at least one service application comprises an application programming interface for coordinating the communication platform account information with the credentials for the service account.

7. The method of claim 6, wherein automatically installing the at least one service application comprises receiving the at least one service application from an app store or marketplace server for the communication platform client application.

8. A system comprising:
a processor; and
at least one memory device including instructions that are executable by the processor to cause the processor to:
receive a selection input directed to connecting a communication platform client application with an external service portal corresponding to a specified external service provider from among a plurality of available external service providers;
transmit, in response to the selection input, communication platform account information to the external service portal;
update a license database using credentials for a service account corresponding to the specified external service provider, the credentials received in response to transmission of the communication platform account information;
automatically install at least one service application configured to access the external service portal from within the communication platform client application; and
coordinate, using the license database and the at least one service application, the communication platform account information with the credentials for the service account.

9. The system of claim 8, wherein the instructions are further executable to cause the processor to:
access the license database in response to activating the at least one service application to verify the credentials for the service account;
connect the at least one service application to the external service portal in response to verifying the credentials;
display an authentication request from the specified external service provider in at least one of the communication platform client application or the at least one service application; and
direct the at least one service application to the external service portal in response to authentication input corresponding to the authentication request.

10. The system of claim 9, wherein the authentication input comprises single sign-on credentials.

11. The system of claim 8, wherein the instructions are further executable to cause the processor to display, in the communication platform client application, selections for the plurality of available external service providers, wherein the selection input is directed to selecting the specified external service provider from among the plurality of available external service providers.

12. The system of claim 11, wherein each of the plurality of available external service providers is a compliance and information protection service, and the at least one service application comprises at least one of an archiving application, a compliance management application, an eDiscovery application, a legal hold application or a data loss prevention application.

13. The system of claim 8, wherein the at least one service application comprises an application programming interface for coordinating the communication platform account information with the credentials for the service account.

14. The system of claim 13, wherein the instructions that cause the processor to automatically install the at least one service application further cause the processor to receive the at least one service application from an app store or marketplace server for the communication platform client application.

15. A non-transitory computer-readable medium comprising code that is executable by a processor for causing the processor to:
receive a selection input directed to connecting a communication platform client application with an external service portal corresponding to a specified external service provider from among a plurality of available external service providers;
transmit, in response to the selection input, communication platform account information to the external service portal;
update a license database using credentials for a service account corresponding to the specified external service provider, the credentials received in response to transmission of the communication platform account information;
automatically install at least one service application configured to access the external service portal from within the communication platform client application; and
coordinate, using the license database and the at least one service application, the communication platform account information with the credentials for the service account.

16. The non-transitory computer-readable medium of claim 15, wherein the code is further executable for causing the processor to:
access the license database in response to activating the at least one service application to verify the credentials for the service account;

connect the at least one service application to the external service portal in response to verifying the credentials;

display an authentication request from the specified external service provider in at least one of the communication platform client application or the at least one service application; and direct the at least one service application to the external service portal in response to authentication input corresponding to the authentication request.

17. The non-transitory computer-readable medium of claim 15, wherein the code is further executable for causing the processor to display, in the communication platform client application, selections for the plurality of available external service providers, wherein the selection input is directed to selecting the specified external service provider from among the plurality of available external service providers.

18. The non-transitory computer-readable medium of claim 17, wherein each of the plurality of available external service providers is a compliance and information protection service, and the at least one service application comprises at least one of an archiving application, a compliance management application, an eDiscovery application, a legal hold application or a data loss prevention application.

19. The non-transitory computer-readable medium of claim 15, wherein the at least one service application comprises an application programming interface for coordinating the communication platform account information with the credentials for the service account.

20. The non-transitory computer-readable medium of claim 19, wherein the code that is executable for causing the processor to automatically install the at least one service application is further executable to cause the processor to automatically receive the at least one service application from an app store or marketplace server for the communication platform client application.

* * * * *